United States Patent
Ozsoylu et al.

(10) Patent No.: US 8,671,795 B2
(45) Date of Patent: Mar. 18, 2014

(54) LOCKING MECHANISM FOR AN ADJUSTABLE STEERING COLUMN HAVING IMPACT TEETH

(75) Inventors: Suat A. Ozsoylu, Rochester Hills, MI (US); Karen A. Boswell, Freeland, MI (US); Michael P. Anspaugh, Bay City, MI (US); Robert W. Dubay, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 576 days.

(21) Appl. No.: 12/367,915

(22) Filed: Feb. 9, 2009

(65) Prior Publication Data
US 2009/0229399 A1    Sep. 17, 2009

Related U.S. Application Data

(60) Provisional application No. 61/068,914, filed on Mar. 11, 2008.

(51) Int. Cl.
*B62D 1/18*    (2006.01)

(52) U.S. Cl.
USPC .......................................................... 74/493

(58) Field of Classification Search
USPC ..................... 74/492, 493, 495; 280/775, 777
See application file for complete search history.

(56) References Cited

U.S. PATENT DOCUMENTS

| | | | |
|---|---|---|---|
| 5,531,317 A | 7/1996 | Tomaru | |
| 5,722,299 A | 3/1998 | Yamamoto et al. | |
| 5,823,062 A | 10/1998 | Snell et al. | |
| 6,139,057 A | 10/2000 | Olgren et al. | |
| 6,419,269 B1 * | 7/2002 | Manwaring et al. | 280/775 |
| 6,616,185 B2 * | 9/2003 | Manwaring et al. | 280/775 |
| 6,659,504 B2 * | 12/2003 | Riefe et al. | 280/777 |
| 7,331,608 B2 * | 2/2008 | Armstrong et al. | 280/775 |
| 7,574,941 B2 * | 8/2009 | Manwaring et al. | 74/492 |
| 7,685,903 B2 * | 3/2010 | Streng et al. | 74/493 |
| 7,819,426 B2 * | 10/2010 | Streng et al. | 280/775 |
| 2002/0171235 A1 | 11/2002 | Riefe et al. | |

(Continued)

FOREIGN PATENT DOCUMENTS

EP    1705098 A1    9/2006
GB    2311839 A    10/1997

OTHER PUBLICATIONS

European Search Report and Office Action dated Feb. 2, 2010 for European Application No. 09154344.7.

*Primary Examiner* — Justin Krause
*Assistant Examiner* — Gregory Prather
(74) *Attorney, Agent, or Firm* — Cantor Colburn LLP (57) ABSTRACT

A steering column assembly includes a mounting bracket and a column jacket moveable relative to the mounting bracket. The mounting bracket defines a rake slot having rake slot teeth and a telescope slot having telescope slot teeth. A shaft extends through the rake slot and the telescope slot transverse to a longitudinal axis of the column jacket. A rake lock having rake lock teeth is disposed within the rake slot and a telescope lock having telescope lock teeth is disposed within the telescope slot. The shaft extends through and rotatably supports the rake lock and the telescope lock. The rake lock and the telescope lock rotate as the rake lock and the telescope lock move into interlocking toothed engagement with the slot teeth to avoid peak-to-peak contact between the lock teeth and the slot teeth, thereby permitting full meshing engagement between the lock teeth and the slot teeth.

26 Claims, 6 Drawing Sheets

(56) References Cited

U.S. PATENT DOCUMENTS

| | | |
|---|---|---|
| 2003/0057694 A1* | 3/2003 | Manwaring et al. .......... 280/775 |
| 2003/0193180 A1* | 10/2003 | Riefe et al. .................... 280/777 |
| 2006/0090586 A1 | 5/2006 | Lee |
| 2006/0207379 A1* | 9/2006 | Riefe et al. ..................... 74/492 |
| 2007/0013180 A1 | 1/2007 | Stuedemann et al. |
| 2008/0178702 A1* | 7/2008 | Lutz ................................ 74/493 |
| 2008/0196536 A1* | 8/2008 | Manwaring et al. ............ 74/493 |
| 2008/0231030 A1 | 9/2008 | Menjak et al. |

\* cited by examiner

LOCKING MECHANISM FOR AN ADJUSTABLE STEERING COLUMN HAVING IMPACT TEETH

CROSS REFERENCE TO RELATED APPLICATION

This application claims the benefit of U.S. Provisional Patent Application Ser. No. 61/068,914, filed Mar. 11, 2008, the disclosure of which is hereby incorporated by reference.

BACKGROUND OF THE INVENTION

1. Field of the Invention

The subject invention generally relates to a steering column assembly, and more specifically to an adjustable steering column assembly.

2. Description of the Prior Art

Steering column assemblies are often adjustable in a longitudinal direction, i.e., a telescopic adjustment, and/or adjustable in a vertical direction, i.e., a rake or pivot adjustment. Typically, the adjustable steering column assemblies include a mounting bracket configured for attachment to the vehicle, and a column jacket coupled to the mounting bracket. The column jacket extends along a longitudinal axis, and is moveable relative to the mounting bracket in at least one of a vertical direction, to adjust the rake adjustment, and a longitudinal direction, to adjust the telescopic adjustment.

The steering column assemblies may utilize one or both of a frictional clamp and an interlocking toothed mechanism to secure the relative position of the column jacket relative to the mounting bracket. The frictional clamp compresses the mounting bracket against a compression bracket, attached to the column jacket, to generate a frictional force to secure the position of the column jacket. However, in the event of an impact event, such as a vehicular collision, the frictional force may be insufficient to secure the position of the column jacket relative to the mounting bracket. Accordingly, many steering column assemblies alternatively utilize, or in combination with the frictional clamp, an interlocking toothed lock mechanism to mechanically lock the position of the column jacket relative to the mounting bracket.

Typically, such interlocking toothed lock mechanisms include one of the mounting bracket and the compression bracket defining a rake slot and a telescope slot respectively. The rake slot and/or the telescope slot define a plurality of slot teeth. A shaft, i.e., a rake bolt, extends through the rake slot and/or the telescope slot. A lock, i.e., a pawl, is disposed within the rake slot and/or the telescope slot, and includes a plurality of lock teeth. A lever is coupled to the shaft to rotate the shaft. Rotation of the shaft moves the lock into and out of a locked position, wherein the lock teeth are disposed in mechanical interlocking engagement with the slot teeth, and an unlocked position, wherein the lock teeth are disengaged from the slot teeth. The interlocking mechanical engagement between the lock teeth and the slot teeth prevent slippage of the column jacket relative to the mounting bracket, even in response to a collision event.

When moving the lock into the locked position from the unlocked position, the lock teeth often engage the slot teeth in peak-to-peak engagement. When this happens, the column jacket must move relative to the mounting bracket to permit a complete or full meshing engagement between the lock teeth and the slot teeth. If the steering column assembly includes a frictional clamp, the frictional force generated and applied between the mounting bracket and the compression bracket at the time of the peak to peak engagement between the lock teeth and the slot teeth may be sufficiently high to prevent the movement of the column jacket relative to the mounting bracket to obtain the full meshing engagement. Failure to achieve the full meshing engagement provides a false sense that the steering column assembly has fully engaged both the frictional clamping mechanism and the interlocking toothed lock mechanism.

SUMMARY OF THE INVENTION AND ADVANTAGES

The subject invention provides a steering column assembly for a vehicle. The steering column assembly comprises a mounting bracket. The mounting bracket is configured for attachment to the vehicle. A column jacket is coupled to the mounting bracket and includes a steering wheel supporting end. The column jacket extends along a longitudinal axis. The column jacket is moveable relative to the mounting bracket in at least one of a vertical direction and a longitudinal direction. Movement of the column jacket in the vertical direction adjusts a vertical position of the steering wheel supporting end. Movement of the column jacket in the longitudinal direction adjusts a longitudinal position of the steering wheel supporting end. At least one of the mounting bracket and the column jacket defines at least one of a rake slot and a telescope slot respectively. The at least one of the rake slot and the telescope slot includes a plurality of slot teeth. A shaft extends through the at least one of the rake slot and the telescope slot transverse to the longitudinal axis. A lock includes a plurality of lock teeth. The lock is disposed within the at least one of the rake slot and the telescope slot. The lock is moveable between a locked position and an unlocked position. When in the locked position, the lock teeth are disposed in interlocking engagement with the slot teeth to prevent movement of the column jacket relative to the mounting bracket. When in the unlocked position, the lock teeth are disengaged from the slot teeth to permit movement of the column jacket relative to the mounting bracket. The lock defines an aperture with the shaft extending through the aperture. The shaft rotatably supports the lock for unobstructed rotation about the shaft. The unobstructed rotation about the shaft permits rotation of the lock relative to the at least one of the rake slot and the telescope slot to align the lock teeth with the slot teeth in full meshing engagement in response to the lock moving into the locked position. Alignment of the lock teeth with the slot teeth limits peak-to-peak contact between the lock teeth and the slot teeth in response to the lock moving into the locked position.

Accordingly, the steering column assembly of the subject invention permits the lock, and thereby the lock teeth, to pivot about the shaft relative to the slot teeth as the lock is moved into the locked position. The pivotal movement of the lock teeth relative to the slot teeth permits the lock teeth to move relative to the slot teeth in the event of peak to peak engagement between the lock teeth and the slot teeth when moving the lock into the locked position, thereby ensuring complete and full meshing engagement between the lock teeth and the slot teeth.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Referring to the Figures, wherein like numerals indicate corresponding parts throughout the several views, a steering column assembly is shown generally at 20. The steering column assembly 20 is for a vehicle, and is adjustable in at least one of a tilt, i.e., rake, direction and a telescopic, i.e., longitudinal direction. The steering column assembly 20 shown and described herein is adjustable in both the rake direction and the longitudinal direction. However, it should be appreciated that the scope of the subject invention only requires that the steering column assembly 20 be adjustable in at least one of the rake direction and the longitudinal direction.

Figure 1:
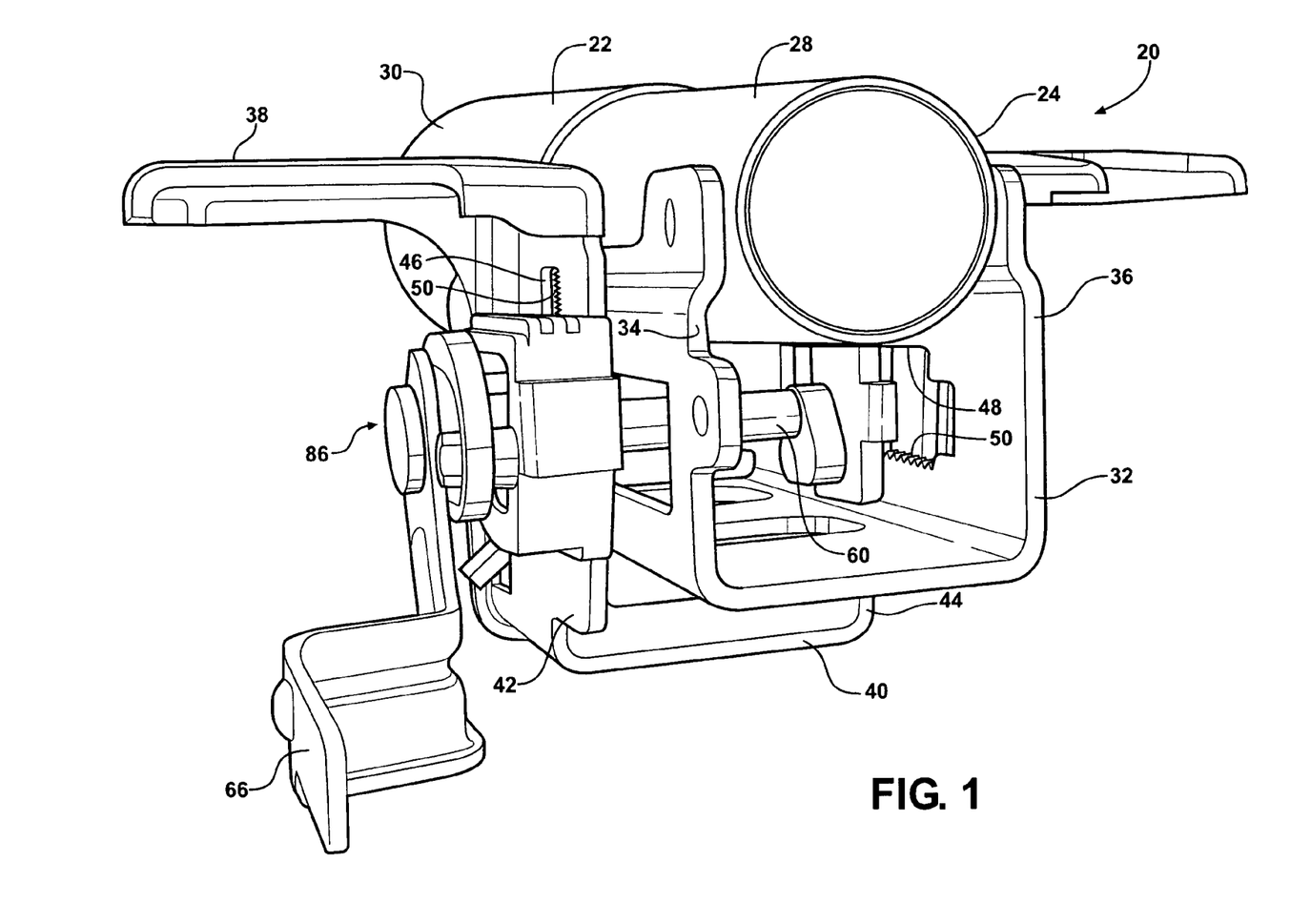
FIG. 1 is a perspective view of a steering column assembly.
Figure 2:
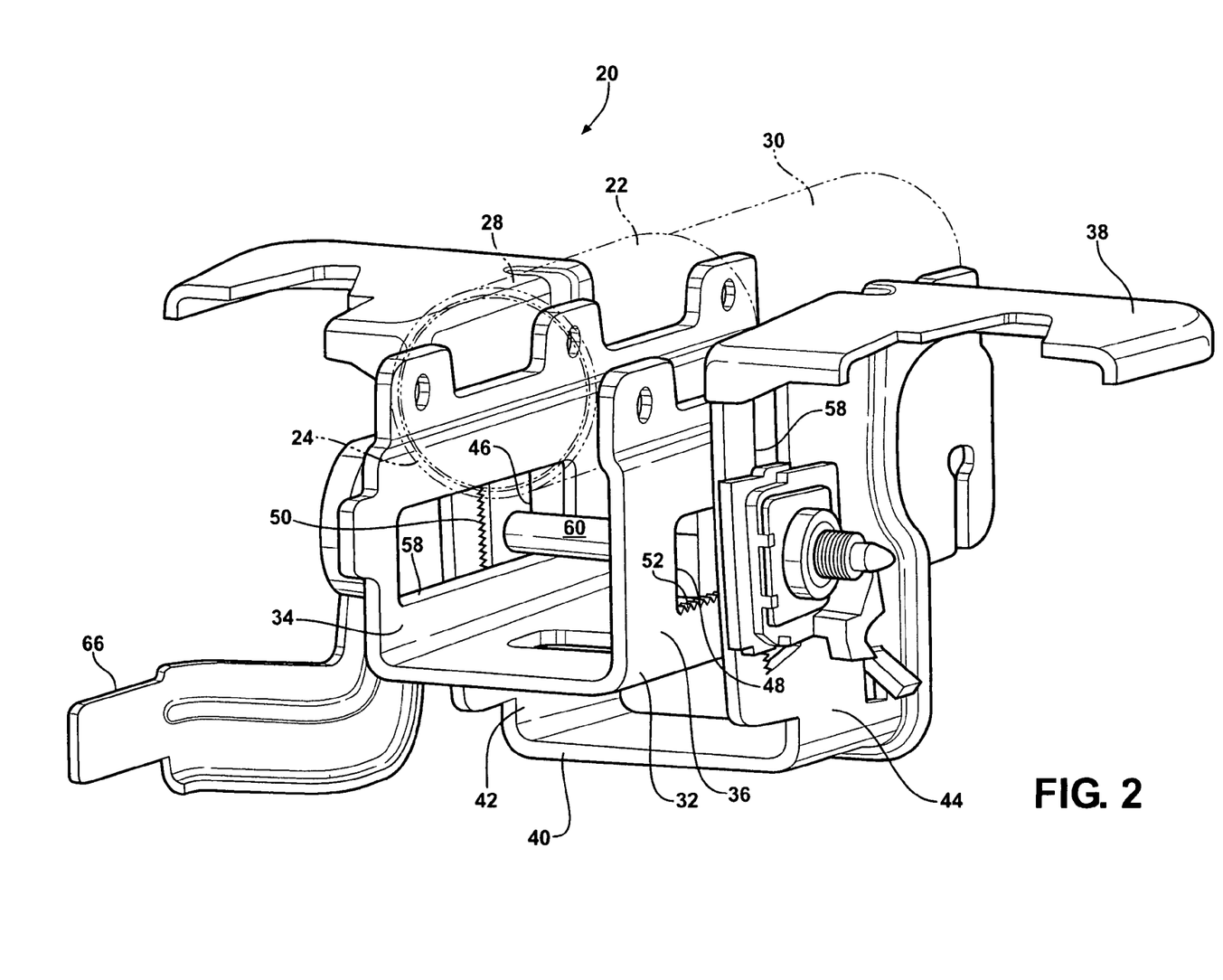
FIG. 2 is a perspective view of the steering column assembly.
Figure 3:
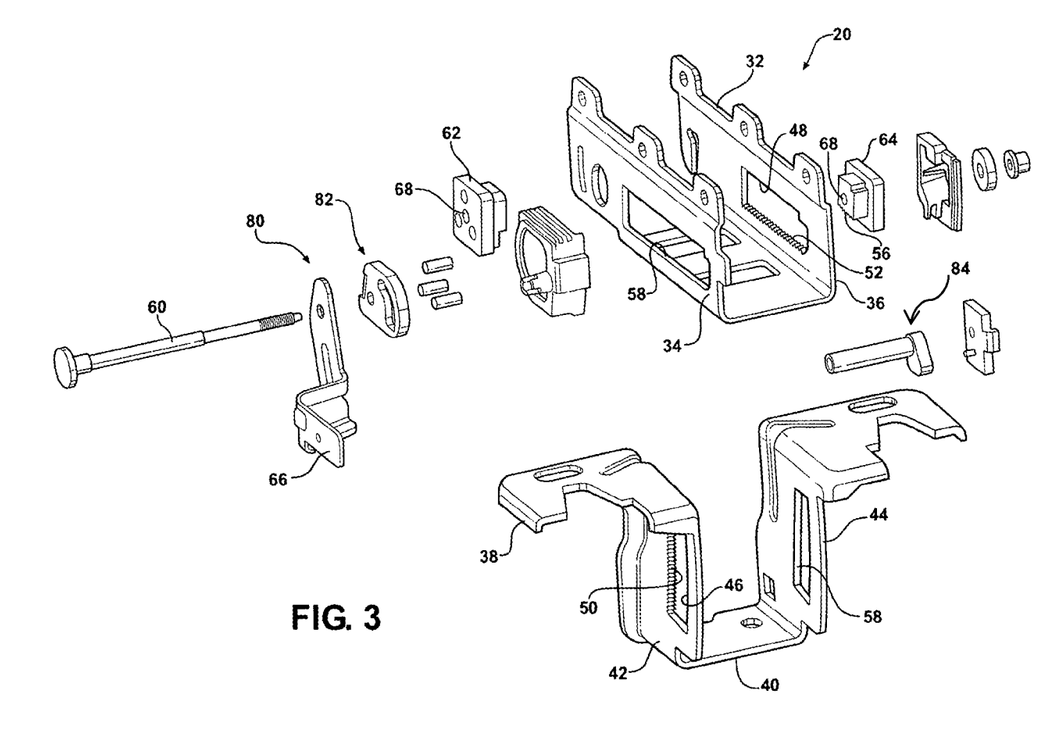
FIG. 3 is an exploded perspective view of the steering column assembly.

Referring to FIGS. 1 through 3, the steering column assembly 20 includes a column jacket 22 having a steering wheel supporting end 24 for supporting a steering wheel (not shown). The column jacket 22 extends along a longitudinal axis 26. Typically, the column jacket 22 includes an upper jacket 28 and a lower jacket 30. The upper jacket 28 is telescopically engaged with and moveable relative to the lower jacket 30. The steering wheel is attached to the upper jacket 28 at the steering wheel supporting end 24. It should be appreciated that the longitudinal adjustment of the column jacket 22 adjusts the longitudinal position of the steering wheel, and is achieved through the telescopic movement between the upper jacket 28 and the lower jacket 30.

As shown, the column jacket 22 includes a compression bracket 32. The compression bracket 32 is fixedly attached to the column jacket 22. The compression bracket 32 includes a first sidewall 34 and a second sidewall 36 disposed on opposing sides of the column jacket 22, and laterally offset from the column jacket 22. The first sidewall 34 and the second sidewall 36 are generally parallel to and spaced from each other, and extend along the longitudinal axis 26. However, it should be appreciated that the compression bracket 32 may be configured to include some other shape and/or configuration to meet the specific design considerations of the vehicle, and may vary from the shape and configuration shown and described herein.

A mounting bracket 38 is coupled to the column jacket 22. The mounting bracket 38 is configured for attachment to the vehicle, and interconnects the column jacket 22 with the vehicle. The mounting bracket 38 may be configured to suit the specific design restraints and considerations of the vehicle, and attached to the vehicle in any suitable manner. Typically, a pair of fasteners, such as bolts, connect the mounting bracket 38 to the vehicle. However, it should be appreciated that the scope of the claims is not dependent upon the manner in which the mounting bracket 38 is configured and attached to the vehicle.

As shown, the mounting bracket 38 includes a bottom wall 40. A first side flange 42 and a second side flange 44 extend generally upwardly from the bottom wall 40. The first side flange 42 and the second side flange 44 are generally parallel to and in spaced relationship relative to each other. The first side flange 42 and the second side flange 44 extend generally along the longitudinal axis 26. The first sidewall 34 and the second sidewall 36 of the compression bracket 32 are disposed between and adjacent to the first side flange 42 and the second side flange 44 respectively, i.e., the first sidewall 34 is adjacent to the first side flange 42 and the second sidewall 36 is adjacent to the second side flange 44.

The column jacket 22 is moveable relative to the mounting bracket 38 in at least one of a vertical direction and a longitudinal direction. Movement in the vertical direction, such as pivotal movement of the column jacket 22 relative to the mounting bracket 38, adjusts a vertical position of the steering wheel supporting end 24 of the column jacket 22 and thereby the vertical position of the steering wheel. Movement in the longitudinal direction, such as through telescopic movement between the upper jacket 28 and the lower jacket 30 relative to the mounting bracket 38, adjusts a longitudinal position of the steering wheel supporting end 24 of the column jacket 22 and thereby the longitudinal position of the steering wheel.

At least one of the mounting bracket 38 and the column jacket 22 defines at least one of a rake slot 46 and a telescope slot 48 respectively. The at least one of the rake slot 46 and the telescope slot 48 include a plurality of slot teeth 50, 52. Preferably, and as shown, the mounting bracket 38 defines the rake slot 46 and the column jacket 22, and more specifically the compression bracket 32, defines the telescope slot 48. The rake slot 46 includes rake slot teeth 50 and the telescope slot 48 includes telescope slot teeth 52. Each of the first sidewall 34 and the second sidewall 36 may define a telescope slot 48, and each of the first side flange 42 and the second side flange 44 may define a rake slot 46. Accordingly, the first side flange 42 and the first sidewall 34 may define the rake slot 46 and the telescope slot 48 respectively on one side of the column jacket 22, and the second side flange 44 and the second sidewall 36 define the other of the rake slot 46 and the telescope slot 48 respectively, on an opposite and opposing side of the column jacket 22.

Each of the rake slot 46 and the telescope slot 48 include at least one slide edge 58 having a smooth surface. The slot teeth 50, 52 are disposed on one edge of the rake slot 46 and/or the telescope slot 48, with the slide edge 58 being disposed on an opposite opposing edge of the respective rake slot 46 and/or telescope slot 48.

A lock 62, 64 is disposed within the at least one of the rake slot 46 and the telescope slot 48. The lock 62, 64 includes a plurality of lock teeth 54, 56. The lock 62, 64 is moveable between a locked position and an unlocked position. When in the locked position, the lock teeth 54, 56 are disposed in interlocking meshing engagement with the slot teeth 50, 52 to prevent movement of the column jacket 22 relative to the mounting bracket 38. When in the unlocked position, the lock teeth 54, 56 are disengaged from the slot teeth 50, 52 thereby permitting movement of the column jacket 22 relative to the mounting bracket 38.

A shaft 60, i.e., a rake bolt, extends through the at least one of the rake slot 46 and the telescope slot 48. The shaft 60 extends along and is rotatable about a shaft axis. The shaft axis is generally transverse or perpendicular to the longitudinal axis 26. The shaft 60 is coupled to and extends through the lock 62, 64. As shown, the shaft 60 is coupled to and extends through both the rake lock 62 and the telescope lock 64. A handle 66 is attached to the shaft 60 for rotating the shaft 60.

Referring to FIGS. 5 through 6 and 8 through 9, the lock 62, 64 defines an aperture 68, with the shaft 60 extending through the aperture 68. The shaft 60 rotatably supports the lock 62, 64 for unobstructed rotation about the shaft 60. The unobstructed rotation of the lock 62, 64 about the shaft 60 permits rotation of the lock 62, 64 relative to the at least one of the rake slot 46 and the telescope slot 48 to align the lock teeth 54, 56 with the slot teeth 50, 52 in full meshing engagement in response to the lock 62, 64 moving into the locked position. Alignment of the lock teeth 54, 56 with the slot teeth 50, 52 in response to movement of the lock 62, 64 into the locked position limits peak-to-peak contact between the lock teeth 54, 56 and the slot teeth 50, 52.

The shaft 60 includes a cross section along the longitudinal axis 26. The cross section of the shaft 60 includes a circular shape that defines a shaft diameter 70. The aperture 68 includes a cross section along the longitudinal axis 26 having a circular shape that defines an aperture diameter 72. The aperture diameter 72 is larger than the shaft diameter 70. It should be appreciated that the aperture diameter 72 is sufficiently greater in size than the shaft diameter 70 to permit free and unrestrained rotation of the lock 62, 64 about the shaft 60.

The lock 62, 64 includes a guide surface 74. The lock teeth 54, 56 of the lock 62, 64 are disposed within one of the rake slot 46 and the telescope slot 48. The guide surface 74 of the lock 62, 64 is disposed within another of the rake slot 46 and the telescope slot 48 disposed adjacent thereto. The guide surface 74 engages the slide edge 58 in sliding engagement when the lock 62, 64 is in the unlocked position. The guide surface 74 includes an undulating surface, such as a sinusoidal wave, that defines at least one crest 76 and at least one valley 78. The guide surface 74 engages the slide edge 58 on one of the at least one crests 76 for guided pivotal rotation about one of the at least one crests 76. The undulating guide surface 74 provides a point, i.e., one of the crests 76, about which the lock 62, 64 may pivot to align the lock teeth 54, 56 with the slot teeth 50, 52.

Figure 5:
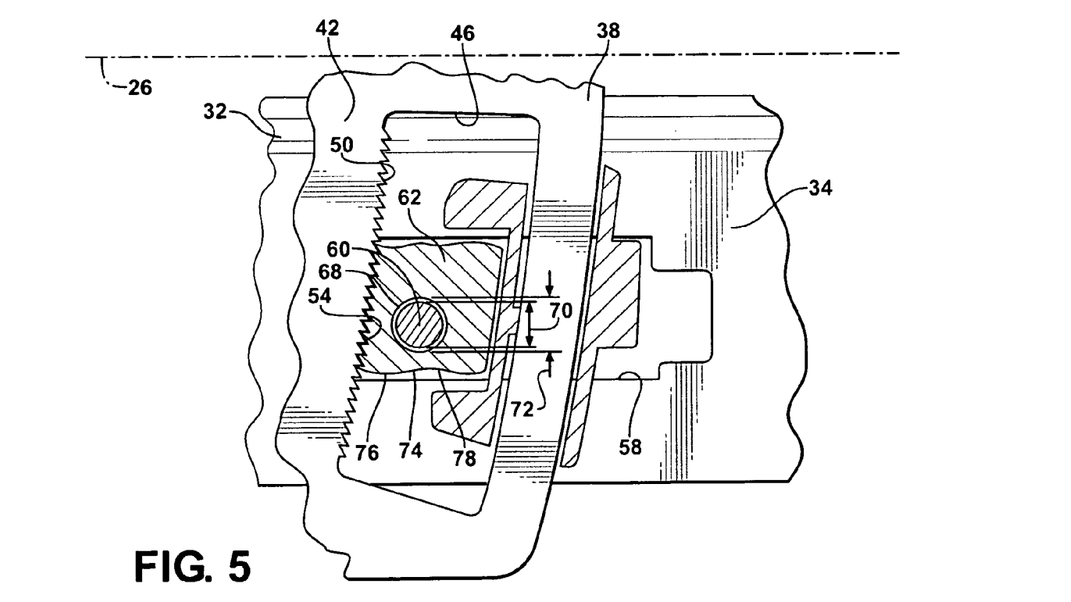
FIG. 5 is a partial fragmentary side plan view of a rake lock in a locked position with a rake slot of the steering column assembly.
Figure 6:
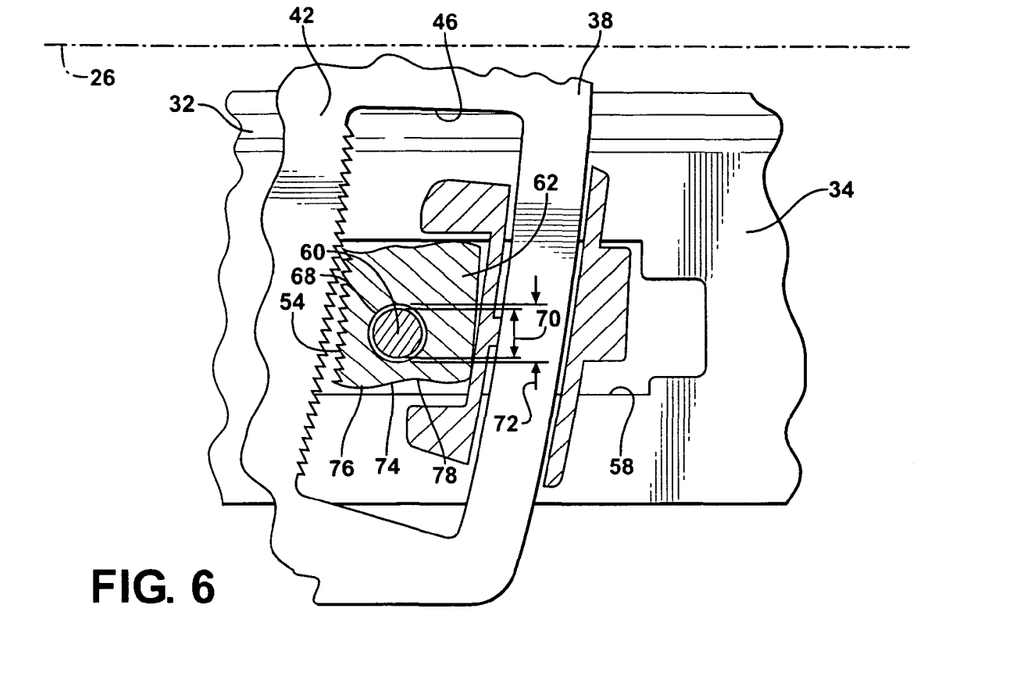
FIG. 6 is a partial fragmentary side plan view of the rake lock in an unlocked position with the rake slot.
Figure 8:
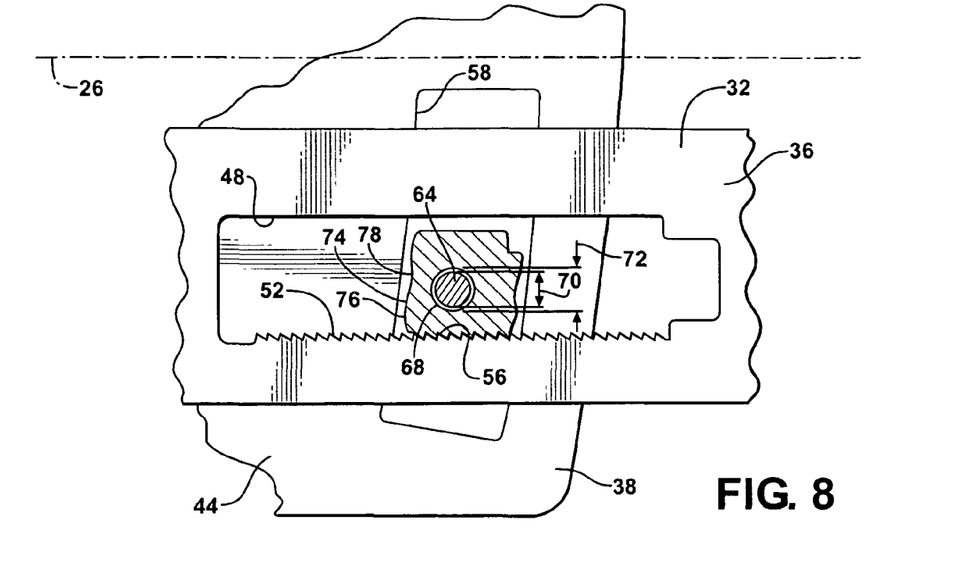
FIG. 8 is a partial fragmentary side plan view of a telescope lock in a locked position with a telescope slot of the steering column assembly.
Figure 9:
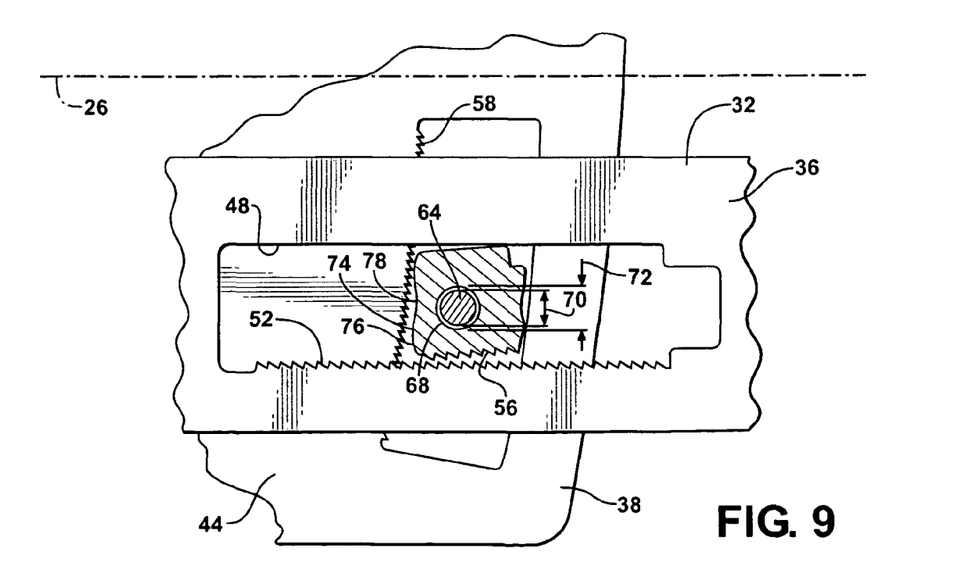
FIG. 9 is a partial fragmentary side plane view of the telescope lock in an unlocked position with the telescope slot.

As shown and described herein, the lock 62, 64 includes a rake lock 62 disposed within the rake slot 46, shown in FIGS. 5 and 6, and a telescope lock 64 disposed within the telescope slot 48, shown in FIGS. 8 and 9. The rake lock 62 includes rake lock teeth 54 for meshing with the rake slot teeth 50. The telescope lock 64 includes telescope lock teeth 56 for meshing with the telescope slot teeth 52. Preferably and as shown, the rake lock 62 and the telescope lock 64 are disposed on opposite sides of the column jacket 22. However, it should be appreciated that the rake lock 62 and the telescope lock 64 may be integrally formed together, and include both the rake lock teeth 54 disposed within the rake slot 46, and the telescope lock teeth 56 disposed within the telescope slot 48.

Accordingly, it should be appreciated that the rake slot 46 having the rake slot teeth 50 is disposed on one side of the column jacket 22, and that the telescope slot 48 adjacent to the rake slot 46 having the rake slot teeth 50 includes the slide edge 58 for which the guide surface 74 of the rake lock 62 abuts. Similarly, the telescope slot 48 having the telescope slot teeth 52 is disposed on the opposite side of the column jacket 22 from the rake slot 46 having the rake slot teeth 50, and that the rake slot 46 adjacent to the telescope slot 48 having the telescope slot teeth 52 includes the slide edge 58 for which the guide surface 74 of the telescope lock 64 abuts.

The steering column assembly 20 includes a locking mechanism 80. The locking mechanism 80 is coupled to the shaft 60. Rotation of the shaft 60 actuates the locking mechanism 80. The locking mechanism 80 moves the rake lock 62 and the telescope lock 64 between the respective locked positions and the unlocked positions. The locking mechanism 80 moves the shaft 60 within each of the rake slot 46 and the telescope slot 48 to move the rake lock 62 and the telescope lock 64 into and out of engagement with the rake slot teeth 50 and the telescope slot teeth 52. However, as described above, the rake lock 62 and the telescope lock 64 are free to rotate about the shaft 60. Therefore, as the shaft 60 is rotated to actuate the locking mechanism 80 to move the locks 62, 64, the locks 62, 64 remain free to rotate about the shaft 60. This permits the lock teeth 54, 56 to rotate relative to the slot teeth 50, 52 to permit alignment therebetween as the lock is moved into engagement with the slot teeth 50, 52.

Figure 4:
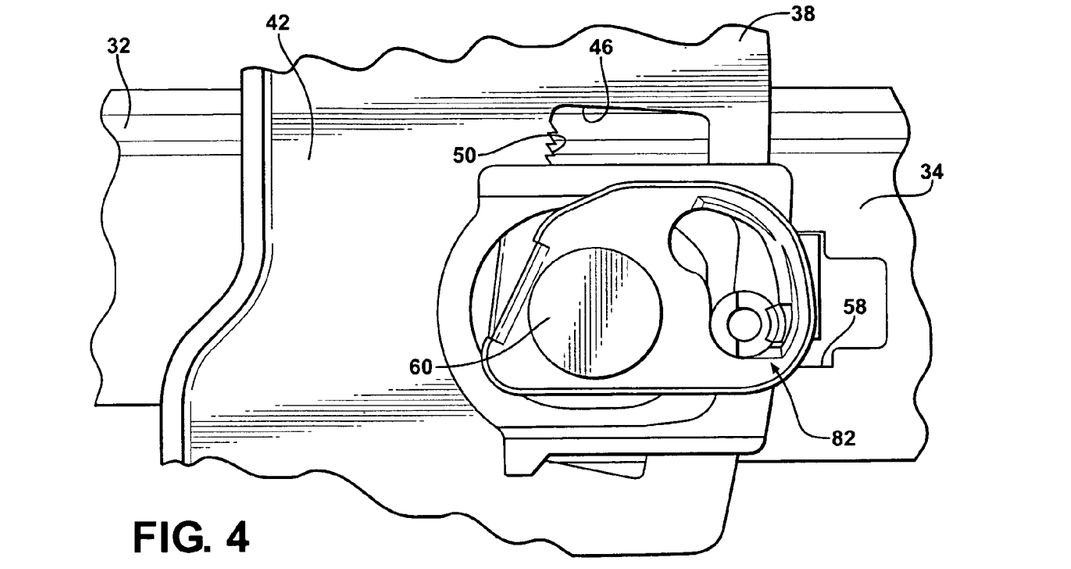
FIG. 4 is a partial fragmentary side plan view of a rake cam of the steering column assembly.
Figure 7:
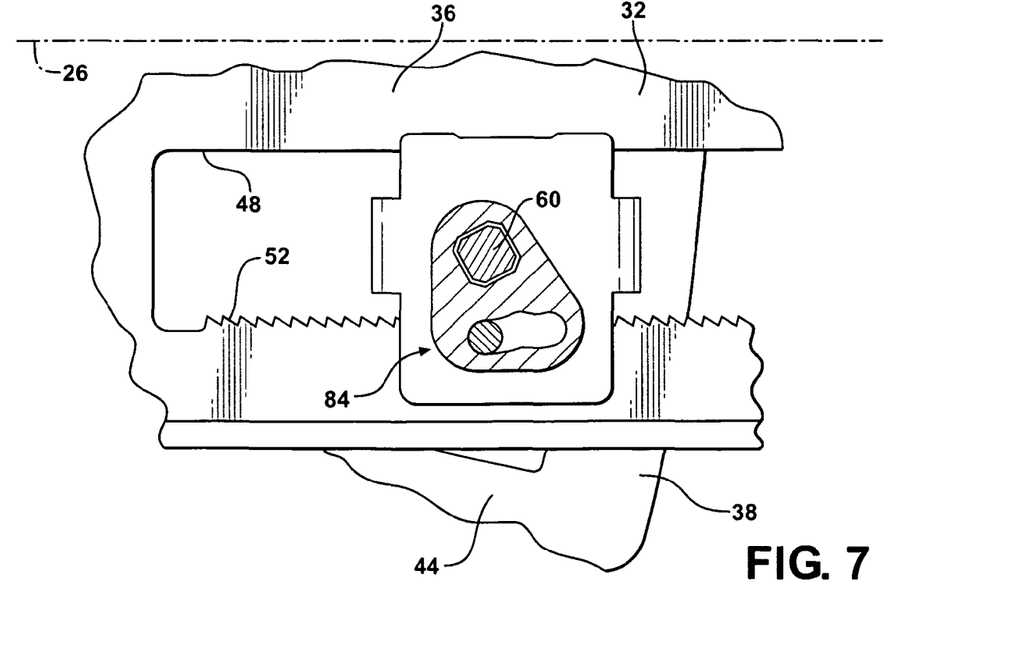
FIG. 7 is a partial fragmentary side plane view of a telescope cam of the steering column assembly.

Preferably, the locking mechanism 80 includes a first cam mechanism 82, shown best in FIG. 4, and a second cam mechanism 84, shown best in FIG. 7. The first cam mechanism 82 moves the rake lock 62. The second cam mechanism 84 moves the telescope lock 64. There are many different types and configurations of cam mechanism suitable for use with the steering column assembly 20 of the subject invention that are capable of linearly moving the shaft 60 in response to rotation of the shaft 60. Accordingly, the scope of the claims is not limited to the exact configuration and/or type of camming mechanism shown herein.

As best shown in FIG. 3, the steering column assembly 20 may further include a compression camming mechanism 86. The compression camming mechanism 86 compresses the mounting bracket 38 against the compression bracket 32 to create a compressive frictional force between the mounting bracket 38 and the compression bracket 32. The compressive frictional force resists movement of the column jacket 22 relative to the mounting bracket 38. More specifically, the compression camming mechanism 86 compresses the first side flange 42 and the second side flange 44 against the first sidewall 34 and the second sidewall 36 respectively, to secure the position of the column jacket 22 relative to the mounting bracket 38. There are many known types and configurations of the compression camming mechanism 86 known that are suitable for use with the steering column assembly 20 of the subject invention. Accordingly, it should be appreciated that the scope of the invention is not limited to the specific type, configuration and/or components of the compression camming mechanism 86. Typically, the compression camming mechanism 86 is coupled to and actuated by rotation of the shaft 60, and operates a cam that biases the first side flange 42 and the second side flange 44 of the mounting bracket 38 inward against eh first sidewall 34 and the second sidewall 36 of the compression bracket 32.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly for a vehicle, said assembly comprising:
   a mounting bracket configured for attachment to the vehicle;
   a column jacket coupled to said mounting bracket and including a steering wheel supporting end and extending along a longitudinal axis and moveable relative to said mounting bracket in at least one of a vertical direction and a longitudinal direction for adjusting at least one of a vertical position and a longitudinal position of said steering wheel supporting end;

at least one of said mounting bracket or said column jacket defining at least one rake slot or at least one telescope slot, another of said mounting bracket or said column jacket defining another of said at least one rake slot or at least one telescope slot, said at least one rake slot and said at least one telescope slot including a plurality of slot teeth;

a shaft extending through said at least one of said rake slot and said telescope slot transverse to said longitudinal axis; and a lock rotatably mounted on said shaft, the lock including a plurality of lock teeth and disposed within said at least one of said rake slot and said telescope slot with said lock moveable between a locked position wherein said lock teeth are disposed in interlocking engagement with said slot teeth to prevent movement of said column jacket relative to said mounting bracket and an unlocked position wherein said lock teeth are disengaged from said slot teeth to permit movement of said column jacket relative to said mounting bracket;

said lock defining an aperture with said shaft extending through said aperture and rotatably supporting said lock, the shaft and aperture configured to allow for unobstructed rotation of the lock about said shaft to permit rotation of said lock relative to said at least one of said rake slot and said telescope slot to align said lock teeth with said slot teeth in full meshing engagement in response to said lock moving into said locked position and to limit peak-to-peak contact between said lock teeth and said slot teeth, said lock further including a guide surface with said lock teeth disposed within one of said at least one rake slot and said at least one telescope slot and said guide surface is disposed within the other of said at least one rake slot and said at least one telescope slot, said guide surface including an undulating surface defining at least two crests and one valley disposed between the two crests, said two crests and said one valley disposed at a same longitudinally extending portion of the lock.

2. An assembly as set forth in claim 1 wherein said shaft includes a cross section along said longitudinal axis having a circular shape defining a shaft diameter and said aperture includes a cross section along said longitudinal axis having a circular shape defining an aperture diameter with said aperture diameter larger than said shaft diameter.

3. An assembly as set forth in claim 1 wherein said mounting bracket defines said at least one rake slot including rake slot teeth and said column jacket defines said at least one telescope slot including telescope slot teeth.

4. An assembly as set forth in claim 3 wherein each of said at least one rake slot and said at least one telescope slot include at least one slide edge having a smooth surface.

5. An assembly as set forth in claim 4 wherein said guide surface engages a slide edge of said at least one slide edge in sliding engagement when said lock is in said unlocked position.

6. An assembly as set forth in claim 5 wherein said guide surface engages said slide edge for guided pivotal rotation about one of said at least two crests.

7. An assembly as set forth in claim 6 wherein said lock includes a rake lock including rake lock teeth for engaging said rake slot teeth and further includes a telescope lock including telescope lock teeth for engaging said telescope slot teeth.

8. An assembly as set forth in claim 7 wherein said column jacket includes a compression bracket.

9. An assembly as set forth in claim 8 wherein said compression bracket includes a first sidewall and a second sidewall parallel to and spaced from said first sidewall and wherein said mounting bracket includes a first side flange adjacent to said first sidewall and a second side flange adjacent to said second sidewall with said first sidewall and said second sidewall disposed between said first side flange and said second side flange.

10. An assembly as set forth in claim 9 wherein said at least one telescope slot includes a first telescope slot and a second telescope slot, said first sidewall defining the first telescope slot and said second sidewall defining the second telescope slot, and wherein said at least one rake slot includes a first rake slot and a second rake slot, said first side flange defining the first rake slot and said second side flange defining the second rake slot.

11. An assembly as set forth in claim 10 wherein said rake lock and said telescope lock are disposed on opposite sides of said column jacket.

12. An assembly as set forth in claim 11 further including a locking mechanism coupled to said shaft for moving said rake lock and said telescope lock between said respective locked positions and said unlocked positions.

13. An assembly as set forth in claim 12 wherein said locking mechanism includes a first cam mechanism for moving said rake lock and a second cam mechanism for moving said telescope lock.

14. An assembly as set forth in claim 13 further comprising a compression camming mechanism for compressing said mounting bracket against said compression bracket to create a compressive frictional force between said mounting bracket and said compression bracket to resist movement of said column jacket relative to said mounting bracket.

15. A steering column assembly for a vehicle, said assembly comprising:

a mounting bracket configured for attachment to the vehicle;

a column jacket coupled to said mounting bracket and moveable relative to the mounting bracket in at least one of a vertical direction and a longitudinal direction;

said mounting bracket defining one of at least one rake slot or at least one telescope slot, and said column jacket defining the other of at least one rake slot or at least one telescope slot, said at least one rake slot and said at least one telescope slot each including a plurality of slot teeth;

a shaft extending through said at least one rake slot and said at least one telescope slot; and a lock rotatably mounted on said shaft, the lock including an aperture formed therein configured to receive said shaft and a plurality of lock teeth configured to lockingly engage and disengage said slot teeth of said at least one rake slot and said at least one telescope slot, said aperture and said shaft shaped and configured to allow said lock to rotate freely about said shaft from a first position where peaks of said lock teeth engage peaks of said slot teeth to a second position where peaks of said lock teeth are lockingly engaged between the peaks of said slot teeth, said lock further comprising a guide surface disposed in the other of the at least one rake slot and at least one telescope slot from which the lock teeth locking engage and disengage said slot teeth, said guide surface including an undulating surface defining at least two crests and one valley disposed between the two crest, said two crests and said one valley disposed at a same longitudinally extending portion of the lock.

16. The assembly of claim 15, wherein said mounting bracket defines said at least one rake slot and said slot teeth are rake slot teeth, and said column jacket defines said at least one telescope slot, and said slot teeth are telescope slot teeth.

17. The assembly of claim 15, wherein the shaft includes a circular cross section having a first diameter, and the aperture includes a circular cross section having a second diameter greater than the first diameter.

18. The assembly of claim 16, wherein said lock includes a rake lock and a telescope lock;
said lock teeth are formed on each of said rake lock and said telescope lock;
said lock teeth of said rake lock are configured to lockingly engage and disengage said rake slot teeth;
said lock teeth of said telescope lock are configured to lockingly engage and disengage said telescope slot teeth; and
each of said rake lock and said telescope lock include said aperture configured to receive said shaft.

19. The assembly of claim 18, wherein said rake lock is disposed at a first side of said column jacket and said telescope lock is disposed at a second side of said column jacket, said first side and said second side are on opposite sides of the column jacket.

20. The assembly of claim 19, wherein said at least one rake slot includes a first rake slot defined by said mounting bracket at said first side of said column jacket and a second rake slot defined by said mounting bracket at said second side of said column jacket; and
said at least one telescope slot includes a first telescope slot defined by said column jacket at said first side of said column jacket and a second telescope slot defined by said column jacket at said second side of said column jacket.

21. The assembly of claim 20, wherein each of said rake lock and said telescope lock include said guide surfaces, said guide surface of said rake lock disposed within said first telescope slot at said first side of said column jacket, and said guide surface of said telescope lock is disposed within said second rake slot at said second side of said column jacket.

22. The assembly of claim 21, wherein each of said first and second rake slots and each of said first and second telescope slots include at least one slide edge having a smooth surface.

23. The assembly of claim 22, wherein said guide surface of said rake lock engages said slide edge of said first telescope slot in sliding engagement when said lock is in an unlocked position, and said guide surface of said telescope lock engages said slide edge of said second rake slot in sliding engagement when said lock is in the unlocked position.

24. The assembly of claim 23, wherein each said undulating surface engages a respective said slide edge for guided pivotal rotation about one of said at least two crests.

25. A steering column assembly for a vehicle, said assembly comprising:
a mounting bracket configured for attachment to the vehicle;
a column jacket coupled to said mounting bracket and including a steering wheel supporting end and extending along a longitudinal axis and moveable relative to said mounting bracket in at least one of a vertical direction and a longitudinal direction for adjusting at least one of a vertical position and a longitudinal position of said steering wheel supporting end, the column jacket including a compression bracket;
at least one of said mounting bracket or said column jacket defining at least one rake slot or at least one telescope slot, another of said mounting bracket or said column jacket defining another of said at least one rake slot or at least one telescope slot, said at least one rake slot and said at least one telescope slot including a plurality of slot teeth;
a shaft extending through said at least one of said rake slot and said telescope slot transverse to said longitudinal axis;
a lock rotatably mounted on said shaft, the lock including a plurality of lock teeth and disposed within said at least one of said rake slot and said telescope slot with said lock moveable between a locked position wherein said lock teeth are disposed in interlocking engagement with said slot teeth to prevent movement of said column jacket relative to said mounting bracket and an unlocked position wherein said lock teeth are disengaged from said slot teeth to permit movement of said column jacket relative to said mounting bracket;
said lock defining an aperture with said shaft extending through said aperture and rotatably supporting said lock, the shaft and aperture configured to allow for unobstructed rotation of the lock about said shaft to permit rotation of said lock relative to said at least one of said rake slot and said telescope slot to align said lock teeth with said slot teeth in full meshing engagement in response to said lock moving into said locked position and to limit peak-to-peak contact between said lock teeth and said slot teeth; and
a compression camming mechanism for compressing said mounting bracket directly against said compression bracket to create a compressive frictional force between said mounting bracket and said compression bracket to resist movement of said column jacket relative to said mounting bracket.

26. A steering column assembly for a vehicle, said assembly comprising:
a mounting bracket configured for attachment to the vehicle;
a column jacket coupled to said mounting bracket and including a steering wheel supporting end and extending along a longitudinal axis and moveable relative to said mounting bracket in at least one of a vertical direction and a longitudinal direction for adjusting at least one of a vertical position and a longitudinal position of said steering wheel supporting end;
at least one of said mounting bracket or said column jacket defining at least one rake slot or at least one telescope slot, another of said mounting bracket or said column jacket defining another of said at least one rake slot or at least one telescope slot, said at least one rake slot and said at least one telescope slot including a plurality of slot teeth;
a shaft extending through said at least one of said rake slot and said telescope slot transverse to said longitudinal axis;
a lock including a plurality of lock teeth and disposed within said at least one of said rake slot and said telescope slot with said lock moveable between a locked position wherein said lock teeth are disposed in interlocking engagement with said slot teeth to prevent movement of said column jacket relative to said mounting bracket and an unlocked position wherein said lock teeth are disengaged from said slot teeth to permit movement of said column jacket relative to said mounting bracket;

said lock defining an aperture with said shaft extending through said aperture and rotatably supporting said lock, the shaft and aperture configured to allow for unobstructed rotation of the lock about said shaft to permit rotation of said lock relative to said at least one of said rake slot and said telescope slot to align said lock teeth with said slot teeth in full meshing engagement in response to said lock moving into said locked position and to limit peak-to-peak contact between said lock teeth and said slot teeth;

said shaft including a cross section along said longitudinal axis having a circular shape defining a shaft diameter and said aperture includes a cross section along said longitudinal axis having a circular shape defining an aperture diameter with said aperture diameter larger than said shaft diameter;

said mounting bracket defining said at least one rake slot including rake slot teeth and said column jacket defines said at least one telescope slot including telescope slot teeth;

said lock including a guide surface with said lock teeth disposed within one of said at least one rake slot and said at least one telescope slot and said guide surface is disposed within the other of said at least one rake slot and said at least one telescope slot;

each of said at least one rake slot and said at least one telescope slot including at least one slide edge having a smooth surface;

said guide surface engaging a slide edge of said at least one slide edge in sliding engagement when said lock is in said unlocked position;

said guide surface including an undulating surface defining at least one crest and at least one valley with said guide surface engaging said slide edge for guided pivotal rotation about one of said at least one crest;

said lock including a rake lock including rake lock teeth for engaging said rake slot teeth and further includes a telescope lock including telescope lock teeth for engaging said telescope slot teeth, a locking mechanism coupled to said shaft for moving said rake lock and said telescope lock between said respective locked positions and said unlocked positions;

said column jacket including a compression bracket including a first sidewall and a second sidewall parallel to and spaced from said first sidewall and wherein said mounting bracket includes a first side flange adjacent to said first sidewall and a second side flange adjacent to said second sidewall with said first sidewall and said second sidewall disposed between said first side flange and said second side flange;

said at least one telescope slot including a first telescope slot and a second telescope slot, said first sidewall defining the first telescope slot and said second sidewall defining the second telescope slot, and wherein said at least one rake slot includes a first rake slot and a second rake slot, said first side flange defining the first rake slot and said second side flange defining the second rake slot;

said rake lock and said telescope lock disposed on opposite sides of said column jacket;

a locking mechanism coupled to said shaft for moving said rake lock and said telescope lock between said respective locked positions and said unlocked positions;

said locking mechanism including a first cam mechanism for moving said rake lock and a second cam mechanism for moving said telescope lock; and a compression camming mechanism for compressing said mounting bracket against said compression bracket to create a compressive frictional force between said mounting bracket and said compression bracket to resist movement of said column jacket relative to said mounting bracket.

\* \* \* \* \*